US006584164B1

(12) United States Patent
Tuukkanen

(10) Patent No.: US 6,584,164 B1
(45) Date of Patent: Jun. 24, 2003

(54) METHOD FOR FORMING A TRAINING SEQUENCE

(75) Inventor: Vesa Tuukkanen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/379,027

(22) Filed: Aug. 23, 1999

(30) Foreign Application Priority Data

Aug. 24, 1998 (FI) .................................................. 981813

(51) Int. Cl.$^7$ ................................................ H04L 7/00
(52) U.S. Cl. ....................... 375/365; 375/259; 375/295; 375/316; 370/503
(58) Field of Search ................................ 375/231, 259, 375/260, 295, 316, 342, 343, 354, 362, 371, 365; 370/503, 507, 516

(56) References Cited

U.S. PATENT DOCUMENTS

| 4,980,767 A | * | 12/1990 | Chao et al. | |
| 5,214,687 A | | 5/1993 | Kansakoski et al. | 379/60 |
| 5,276,691 A | | 1/1994 | Kivari | 371/47.1 |
| 5,440,347 A | * | 8/1995 | Guan | |
| 5,450,456 A | | 9/1995 | Mueller | 375/224 |
| 5,502,749 A | * | 3/1996 | Ozaki | 375/368 |
| 5,561,468 A | * | 10/1996 | Bryan et al. | |
| 5,703,873 A | | 12/1997 | Ojanpera et al. | 370/332 |
| 5,726,981 A | | 3/1998 | Ylitervo et al. | 370/332 |
| 5,764,632 A | | 6/1998 | Ylitervo | 370/337 |
| 5,838,672 A | | 11/1998 | Ranta | 370/335 |
| 5,864,759 A | | 1/1999 | Tat | 455/437 |
| 6,266,382 B1 | * | 7/2001 | Lai | 375/354 |

* cited by examiner

Primary Examiner—Jean Corrielus
(74) Attorney, Agent, or Firm—Perman & Green, LLP

(57) ABSTRACT

The invention relates to a method for forming a training sequence in a communication system, in which information is transmitted at one or several carrier frequencies, the training sequence (T) being used at least as a synchronization signal. The training sequence (T) is composed of three or more training parts (103–106; 209–212) by any of the following methods. In the first method, at least two adjacent training parts (103, 104; 209, 210) in the training sequence (T) are formed substantially identical, and furthermore, at least one training part (105, 106; 211, 212) is formed substantially as a negation to said identical training parts (103, 104; 209, 210). In the second method, at least two adjacent training parts (103, 104; 209, 210) in the training sequence (T) are formed substantially identical, and furthermore, at least one training part (105, 106; 211, 212) is formed substantially different from said identical training parts. In the third method, at least two adjacent training parts (103, 104; 209, 210) in the training sequence (T) are formed substantially as negations to each other, and furthermore, at least one training part (105, 106; 211, 212) is formed substantially different.

33 Claims, 7 Drawing Sheets

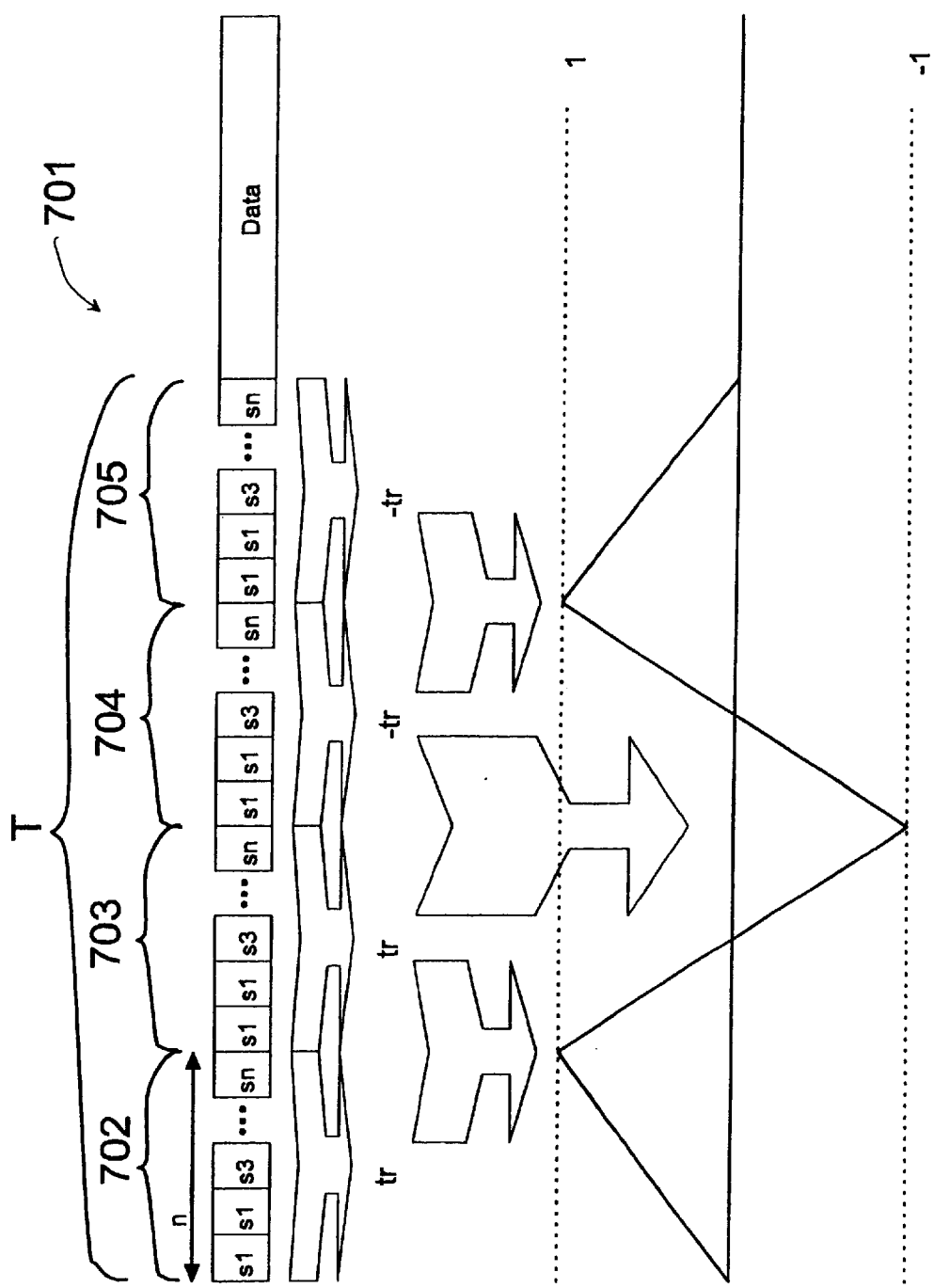

METHOD FOR FORMING A TRAINING SEQUENCE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

Figure 1:
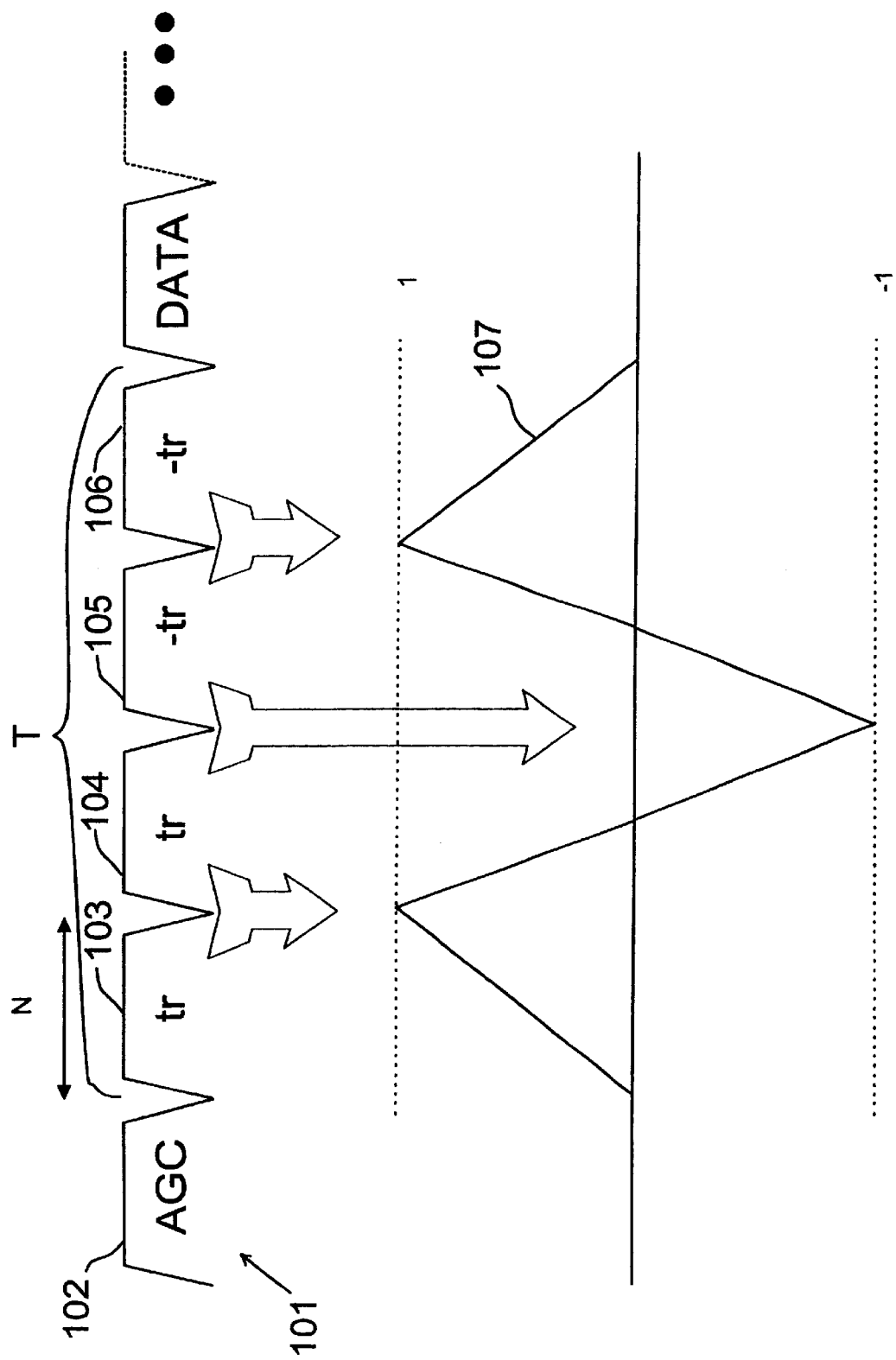

The present invention relates to a method for forming a training sequence in communication in a communication system where information is transmitted at one or several carrier frequencies, the training sequence being used at least as a synchronization signal. The invention relates further to a transmitter for transmitting information in one or several data frames at one or several carrier frequencies, the transmitter comprising means for forming at least one training sequence and attaching the same to the data frame to be transmitted, and the training sequence being intended for synchronizing the receiver. Furthermore, the invention relates to a receiver comprising means for synchronizing the receiver to a received signal which at the transmitting stage is provided with at least one training sequence, as well as a communication system comprising a transmitter for transmitting information into a communication channel in one or several data frames, and means for forming at least one training sequence and attaching the same to a data frame to be transmitted, a receiver for receiving transmitted information from the communication channel, and means for synchronizing the receiver.

2. Description of the Related Art Including Information Disclosed Under 37 CRF 1.97 and 1.98

Transmission of signals from a transmitter to a receiver via the radio channel is subject to a number of interference factors. For example, weather changes cause so-called fading, wherein at the receiving end, the strength of the signal varies and may prevent correct reception of information. Other interference factors include channel noise and ignition interference caused by electric devices. Particularly in urban areas, one significant interference factor affecting the reliability of data transmission is multipath propagation which is caused by the fact that the signal enters the receiver via several different routes, and the path traveled by these different signals can differ in length. As a result, the different signals enter the receiver in different phases, thereby disturbing correct transmission of information. The situation is even more complicated when the transmitter or the receiver is moving, because the situation changes all the time, wherein synchronization of the receiver is difficult.

One method for reducing the effect of these said interference factors is to transmit information in parallel. Thus, the bits of information to be transmitted are divided into groups, and each group is demodulated at subcarriers of different wavelengths. At the receiving end, these signals of different carrier frequencies are received and modulated, and subsequently connected to a bit string corresponding to the original information that was transmitted. In such a method, it is possible to reduce the bit rate of each group and still obtain the same final bit rate. For example, in a situation where eight subcarriers are used, the bit rate of each group can be reduced to an eighth part. Thus, particularly interference of short duration affect the transmission of information substantially less than in a situation where information is transmitted in series mode, i.e. modulated by one carrier. One method used for such serial transmission of information is the so-called OFDM modulation technique, i.e. orthogonal frequency division multiplexing. Below in this description, this technique will be referred to by the abbreviation OFDM.

The information to be transmitted can be any information as such, including audio signals, video signals, data files, text messages, etc. However, information in analog form is converted into binary form with an analog/digital converter before modulation. The binary information is divided into blocks of preferably fixed size. Each of these blocks is coded and transmitted as one data frame. Usually, such a block is further divided into smaller groups, each group consisting of typically two to five bits. Each of these groups is modulated at one subcarrier frequency. In the modulation, the amplitude and phase of the subcarrier frequency is set to a value determined on the basis of the value of the bits in the group. Thus, in a situation where the group consists of m bits, the modulation results in $2^m$ different alternatives for the phase and the amplitude. In this description, these alternatives are called the constellation. For example, in quadrature amplitude modulation (QAM), the size of the modulating group is given in the form $2^m$-QAM, for example 4-QAM, 16-QAM or 64-QAM. It is obvious that also other modulation techniques can be used in connection with this invention.

In the receiver, each subcarrier frequency is demodulated to find out which symbol was transmitted in each group. This is conducted by examining from the received signal at each subcarrier frequency the phase and amplitude of the signal, to decide which signal point is closest to the received signal point. This signal point determines which symbol was probably transmitted. Subsequently, the original block can be reconstructed by combining the groups received at different sub-carrier frequencies and demodulated.

Irrespective of whether the information was coded according to either or both the phase and the amplitude of the signal transmitted, it is necessary to synchronize the receiver with the received signal. Typically, each block must be synchronized independently, because in many systems the receiver does not know the exact moment of transmission. Therefore, each block to be transmitted must include synchronization data, on the basis of which the receiver tries to synchronize itself with the received signal and to find out the information transmitted. To eliminate phase and frequency errors, the transmitter modulating frequencies should be kept exactly constant, and correspondingly, the demodulation frequencies in the receiver should be at the correct frequency and the frequency should be as constant as possible, which requires the use of high-quality components as well as relatively complicated circuits. Known synchronization methods are often based on the use of training components which are typically identical. In synchronization, it is known to use an optimal matched filter (MF) whose coefficients are matched with the training parts of the received signal. The coefficients are usually fixed and they must be known to the receiver. The design of such matched filters requires complicated computing, and furthermore, each OFDM symbol must be equipped at the transmission stage with a guard time to eliminate the effect of multipath propagation. In the case of a matched filter, multipath propagation is not taken into account in the filter coefficients. If the guard time is not added to the OFDM symbol, the output of the matched filter includes extra peaks formed by incoming signals in the receiver at different delay times. Another known solution is the use of a simpler synchronizer, where subsequent similar training parts are correlated with each other, wherein multipath propagation of the channel affects both of the symbols to be correlated in the same way. The receiver does not need to know the training parts.

In a simpler receiver synchronizer, a correlation of the training parts is determined, resulting in a step function in the case that the training parts are identical. However, it is very difficult to deduce the correct timing and frequency, particularly with varying power levels of the signal to be received. Timing and frequency errors are caused by different unideal conditions, the oscillator, the communication channel, etc. Bit errors occur if timing and frequency errors are not corrected in the receiver. In the case of a timing error, Fourier conversion is made at a wrong location. The frequency error leads to rotation of signal points (constellation points). The transmitter and the receiver must be synchronized with each other, to eliminate bit errors.

Several synchronization methods are known, but most of them are based on correlation between the received signal and a known training sequence consisting of one or several identical/training parts, or on correlation between the guard time and the corresponding OFDM symbol. Furthermore, there are synchronization methods in which some of the OFDM subcarriers are used for synchronization only (so-called pilot carriers).

BRIEF SUMMARY OF THE INVENTION

It is a purpose of the present invention to provide a method for forming training parts in such a way that the synchronization of the receiver with the transmitted signal is improved with respect to using training parts of prior art. The invention is based on the idea that the training sequence is formed in such a way that correlation of two subsequently received training sequences results in at least one peak, preferably an alternating positive and negative peak. This is achieved preferably in such a way that at least two subsequent training parts in the training sequence are identical, and at least one training part is the negation of these. The method according to the present invention is characterized in that the training sequence is composed of three or more training parts in such a way that in the training sequence:

- at least two adjacent training parts are formed substantially identical, and furthermore, at least one training part is formed substantially as a negation to said identical training parts, or
- at least two adjacent training parts are formed substantially identical, and furthermore, at least one training part is formed substantially different from said identical training parts, or
- at least two adjacent training parts are formed substantially as negations to each other, and furthermore, at least one training part is formed substantially different.

The transmitter according to the present invention is characterized in that the transmitter comprises means for forming the training sequence from three or more training parts in such a way that

- at least two adjacent training parts are formed substantially identical, and furthermore, at least one training part is formed substantially as a negation to said identical training parts, or
- at least two adjacent training parts are formed substantially identical, and furthermore, at least one training part is formed substantially different from said identical training parts, or
- at least two adjacent training parts are formed substantially as negations to each other, and furthermore, at least one training part is formed substantially different.

The receiver of the present invention is characterized in that the means for synchronizing the receiver comprise:

- means for forming a correlation function on the basis of the received training sequence,
- means for finding at least one maximum or minimum point in the correlation function, and
- means for determining the timing moment and the phase error on the basis of at least one found maximum or minimum point.

Furthermore, the communication system according to the present invention is characterized in that the communication system comprises further means for forming a training sequence of three or more training parts in such a way that

- at least two adjacent training parts are formed substantially identical, and furthermore, at least one training part is formed substantially as a negation to said identical training parts, or
- at least two adjacent training parts are formed substantially identical, and furthermore, at least one training part is formed substantially different from said identical training parts, or
- at least two adjacent training parts are formed substantially as negations to each other, and furthermore, at least one training part is formed substantially different.

The present invention gives significant advantages to solutions of prior art. From the received signal, it is easy to determine the correct timing and the carrier frequency error, for example for the reason that a positive maximum and a negative maximum are preferably alternating in the correlation function. In the communication system according to the invention, the receiver can be synchronized better and timing and frequency errors can be corrected more accurately than in communication systems of prior art. Moreover, the method according to the invention is also less sensitive to multipath propagation than solutions of prior art.

BRIEF DESCRIPTION OF THE SEVERAL VIEWS OF THE DRAWING(S)

Figure 2:
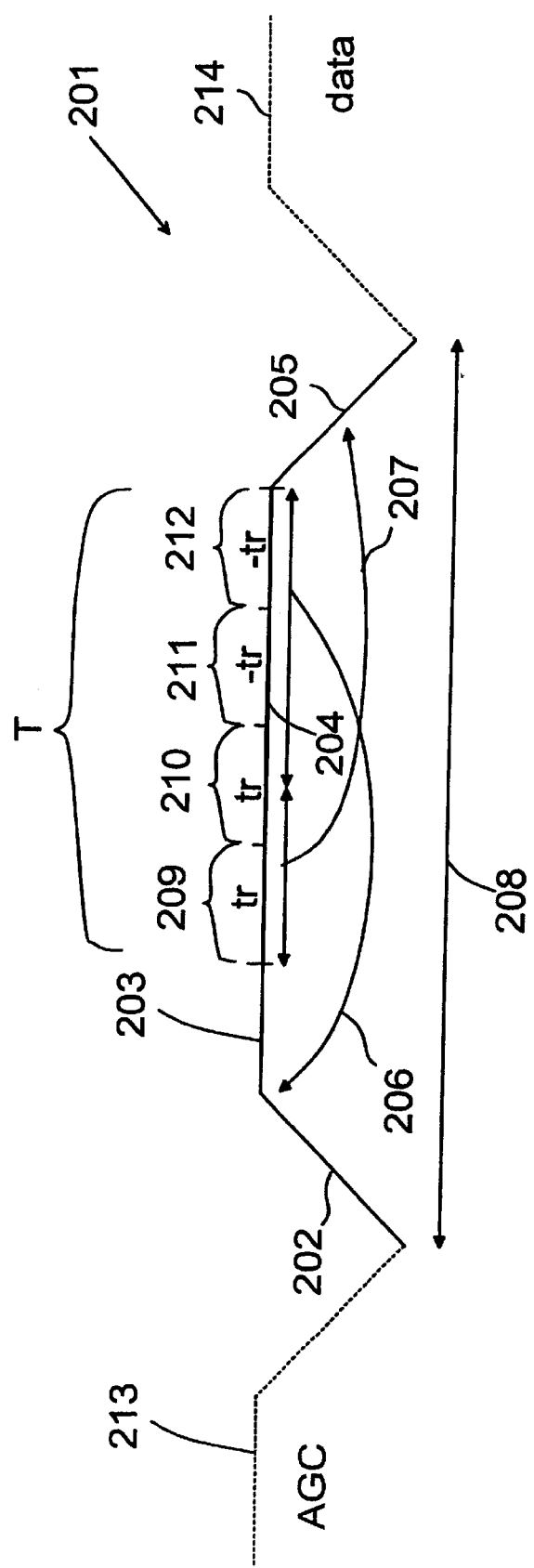
Figure 3:
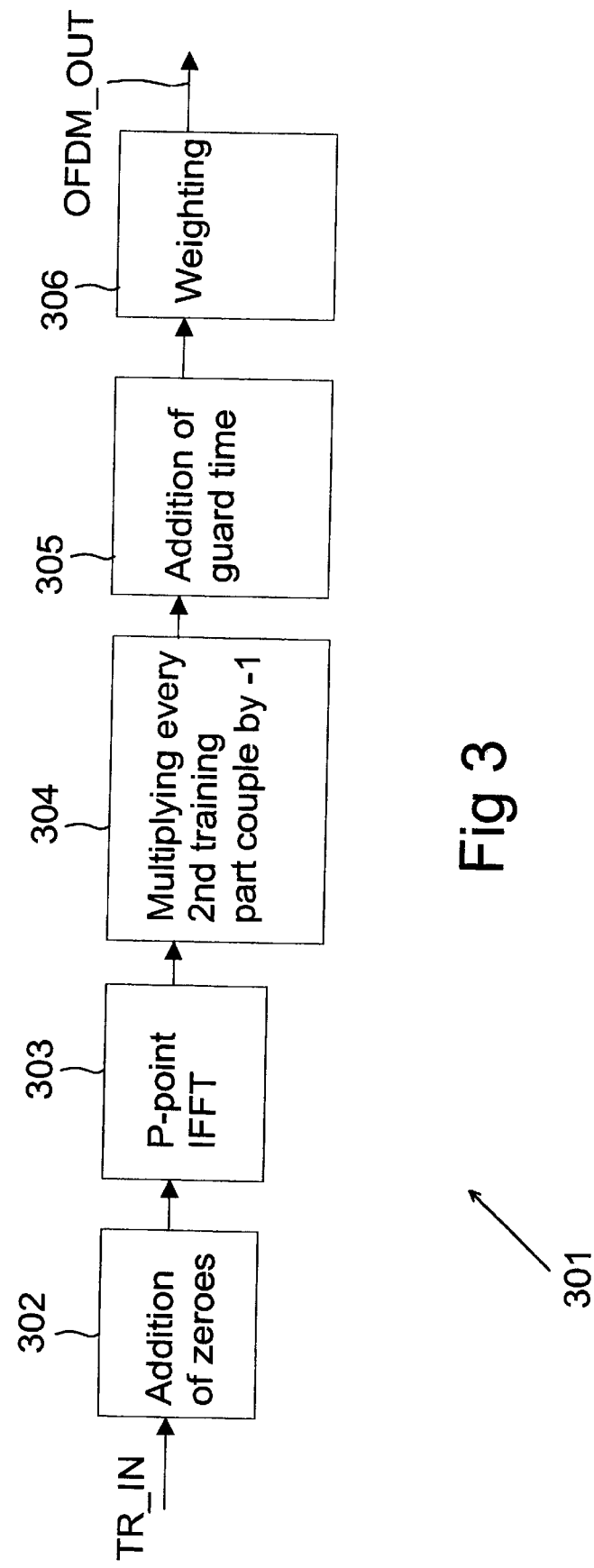
Figure 4:
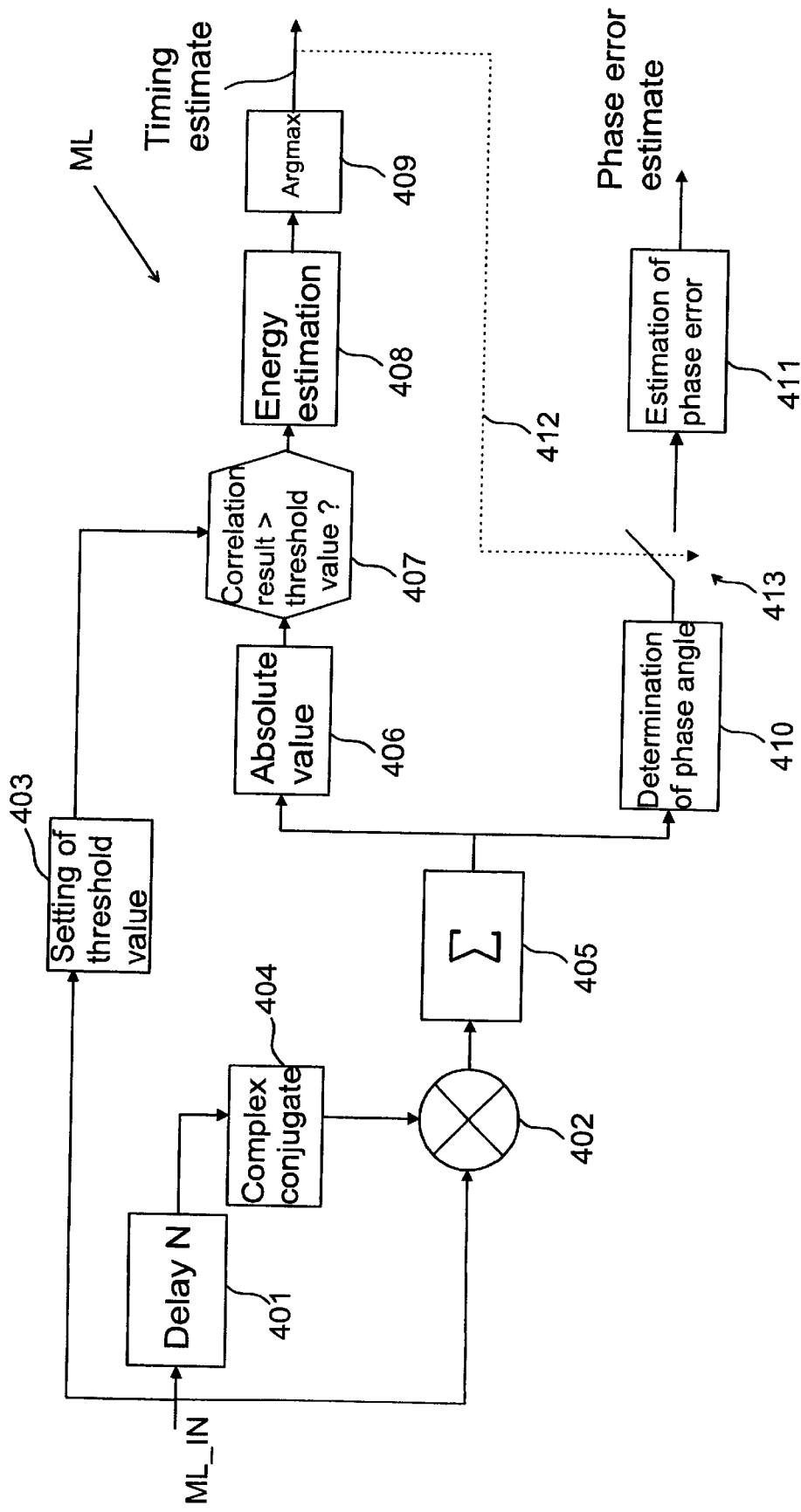
Figure 5A:
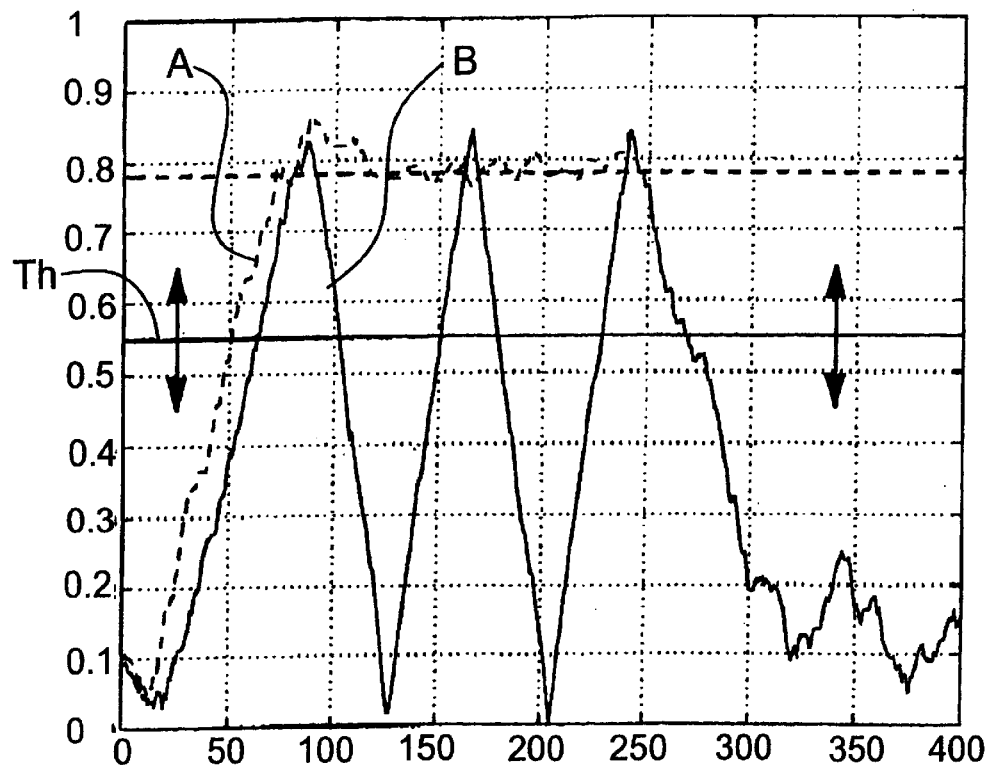
Figure 5B:
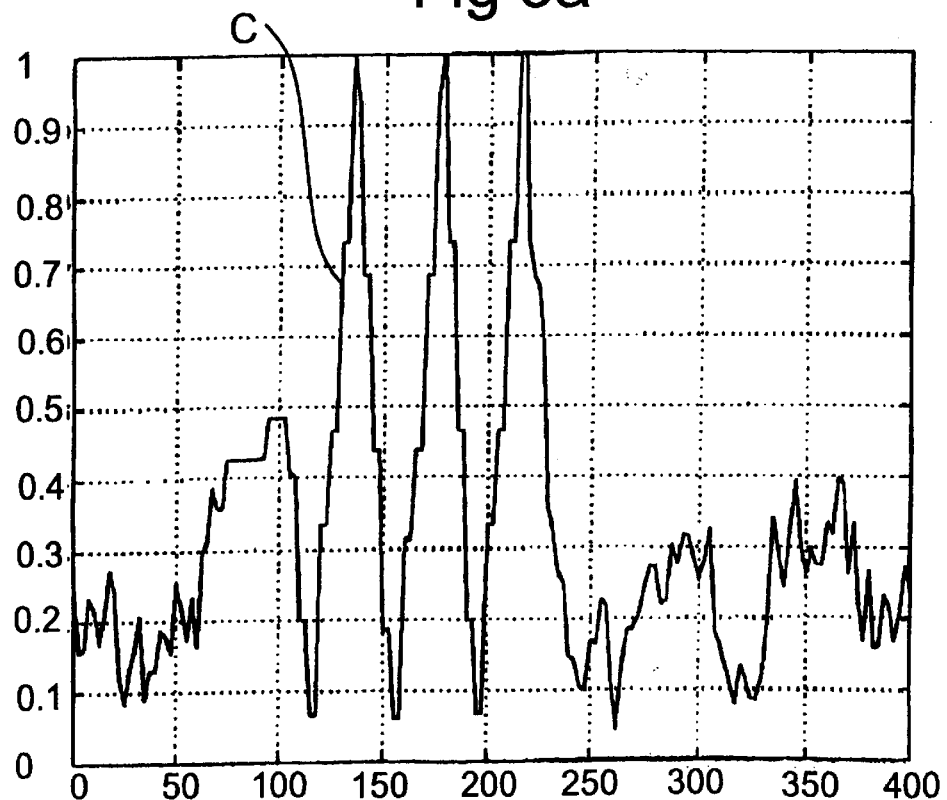
Figure 6:
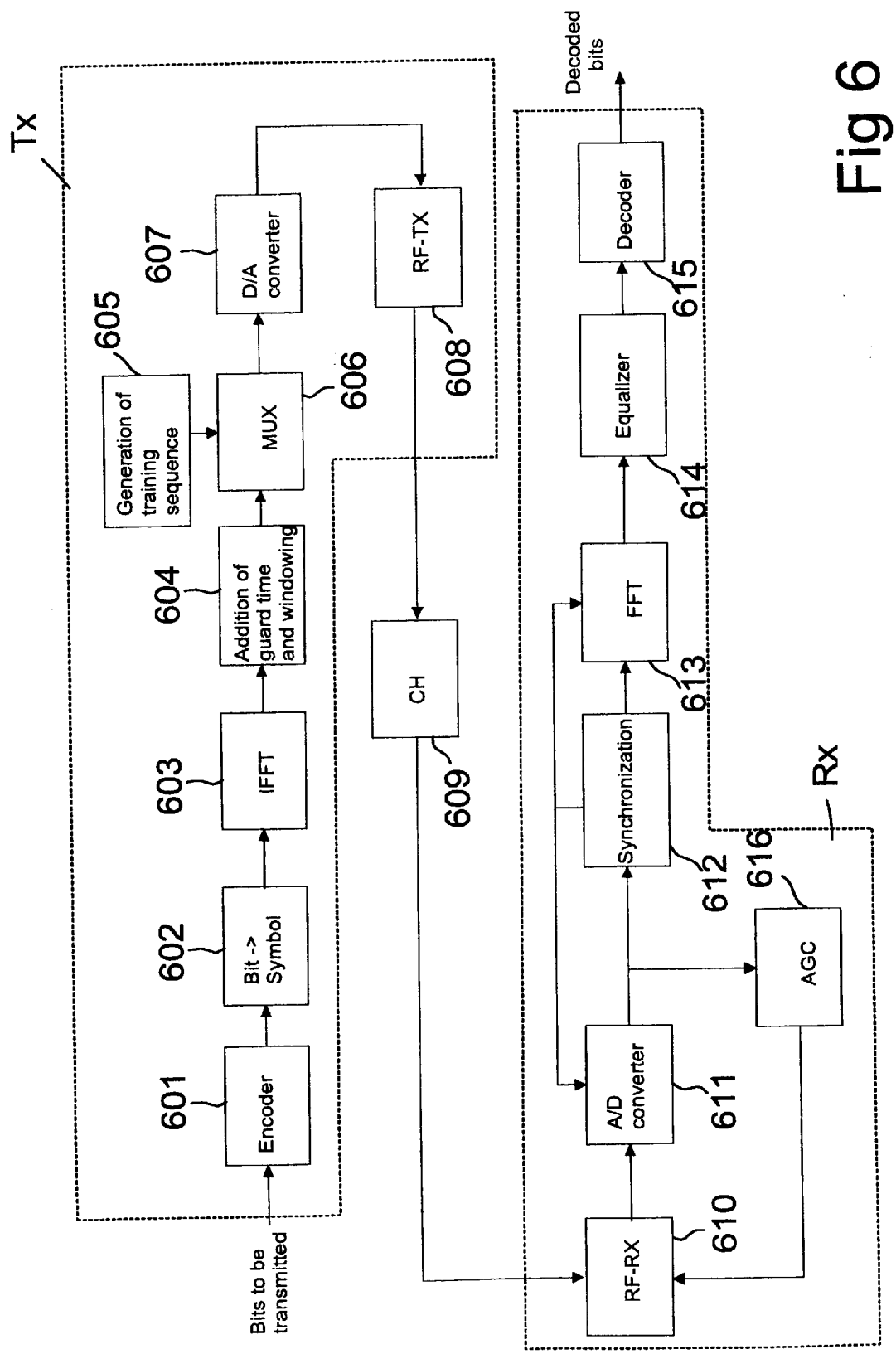

In the following, the invention will be described in more detail with reference to the appended drawings, in which FIG. 1 shows the structure of a training sequence as well as a correlation result according to a first advantageous embodiment of the invention, FIG. 2 shows the structure of a training sequence according to a second advantageous embodiment of the invention, FIG. 3 is a reduced block chart illustrating the formation of a training sequence according to the second advantageous embodiment of the invention, FIG. 4 shows an advantageous synchronizer which can be used in a receiver according to the invention, FIGS. 5a and 5b illustrate simulation results with training sequences according to an advantageous embodiment of the invention, FIG. 6 shows a communication system according to an advantageous embodiment of the invention, and FIG. 7 shows the structure of a training sequence in a one-carrier system as well as a correlation result according to an advantageous embodiment of the invention.

DETAILED DESCRIPTION OF THE INVENTION

FIG. 1 shows in a reduced manner a part of the beginning of a data frame 101 containing a training sequence T according to a first advantageous embodiment of the invention. In this context, the training sequence T refers to an information sequence formed of one or several parts in a data frame. Training sequences T are placed in the beginning of data frames 101 (physical data unit, PDU) before the actual information to be transmitted, wherein in the receiver, the training sequence T is used particularly to determine the timing shift and the frequency shift, and to evaluate of the features of the communication channel. Consequently, a data frame consists of OFDM symbols, some of which are used for transmitting training parts and some for transmitting information. A first header 102 in a data frame (automatic gain control, AGC) is intended for adjusting the amplification of the receiver according to the strength of the received signal, which is known as such. The data frame 101 of FIG. 1 consists of symbols having a length of N samples. In this embodiment, the length of the training sequence T is four training parts, each forming one OFDM symbol. These training parts are indicated with reference numbers 103, 104, 105 and 106. In the receiver, the correlation between two subsequent training parts is determined on the whole length of the training sequence. Consequently, in this example, three correlations are determined: between the first 103 and second training part 104, between the second 104 and third training part 105, and between the third 105 and fourth training part 106, respectively. These training parts are preferably formed in a way that subsequent correlations result in a positive and a negative maximum (peak), alternatingly. This is obtained so that the first 103 and second training part 104 are substantially identical and the third 105 and fourth training part 106 are preferably substantially negations to the first 103 and second training part 104. In other words, the first 103 and second training part 104 correlate well with each other, the third training part 105 correlates well but negatively with the second training part 104, and the third training part 105 correlates well with the fourth training part 106. However, the invention can also be applied in a way that the correlations of subsequent training parts result either in a peak (positive or negative) or a value close to zero. This can be obtained e.g. in a way that the first 103 and second training part 104 are substantially identical or negations to each other, and that the third 105 and possibly also the fourth training part 106 differs substantially from the first 103 and second training part 104 but are not negations to them. Consequently, the first 103 and second training part 104 correlate well with each other but the third training part 105 correlates poorly with the second part 104. Furthermore, it should be mentioned that even though subsequent training parts were not fully identical or identical negations to each other, the peaks in the correlation results can still be found but the evaluation accuracy is not necessarily as good.

Correlation results are indicated by a line 107 in FIG. 1, and it is normalized in a way that the absolute values of the peaks are less than or equal to 1. In systems of prior art, all training parts are selected to be identical, which, upon determining of the correlation, produces a step function, on the basis of which it is difficult to estimate the correct timing moment. Variation in the strength of the received signal makes the finding of the maximum point even more difficult.

One possibility to implement the training sequence is that it comprises three training parts, two of them being substantially identical to each other and one being substantially the negation of these. Thus, the correlation would give one positive peak and one negative peak.

FIG. 2 illustrates part of another data frame 201 which shows the structure of an OFDM symbol in a reduced manner. The OFDM symbol 208 consists of a ramping up time 202, a guard time 203, an effective part 204, and a ramping down time 205. The length of the guard time 203 is variable in different applications and can be even zero. The ramping up time 202 and the guard time 203 are formed by copying from the end of the effective part 204 a section having the length of the ramping up time 202 and the guard time 203 into this location. This operation is indicated by an arrow 206 in FIG. 2. In a corresponding manner, the ramping down time 205 is formed from a copy of the beginning of the effective part 204 (indicated by an arrow 207 in the figure).

The actual information (payload) is transmitted in data frames 101, 201 after the training sequence. Consequently, the training sequence T takes up some of the data transmission capacity, four symbols in the example presented above. By making the training sequence T shorter, it is possible to reduce its effect in the actual data transmission capacity. In this case, however, the accuracy of the synchronization is not necessarily as good as when using a longer training sequence. The training sequence T, whose length corresponds to the effective part of the OFDM symbol, can be formed e.g. in a way that it comprises two substantially identical training parts and two substantial negations to these. This is illustrated in FIG. 2 with the OFDM symbol 208 of the data frame 201, in which there is after the ramping up time 202 and the guard time 203 an effective part 204 constituting a training sequence T according to the second advantageous embodiment of the invention. This consists of two identical training parts 209, 210 (tr) and two identical training parts 211, 212 (–tr) which are negations to the first part tr. In this case, the length of the training parts is N samples, and the correlation is determined between two training parts for the entire length of the training sequence T. The data frame of FIG. 2 indicates also part of an AGC symbol 213 as well as the first data symbol 214.

FIG. 3 is a reduced block chart showing an OFDM modulator 301 according to the second advantageous embodiment of the invention which can be used e.g. for forming a training sequence of FIG. 2. It is assumed that P-point inverse Fourier transform (P-IFFT) is used. Furthermore, P/N must be an integer number. The training part tr to be used in forming the training sequence is conveyed to an input line TR_IN. Via the input line TR_IN, the training part tr is conveyed to a filling block 302 (zero padding), in which P/N−1 times zeroes are filled in between the samples of the training part, wherein a data string of P samples is obtained. In the example of FIG. 2, three zeroes are added between the samples. From the filling block 302, the data string is conveyed to an IFFT block 303 conducting the inverse fast Fourier transformation. This IFFT block 303 conducts advantageously the inverse Fourier transformation of P points (P is a power of two). Thus, the same IFFT block 303 can be used both in the formation of the training sequence T and for formation of OFDM symbols from the actual information to be transmitted. Consequently, the IFFT block provides a time domain signal which is conducted to a multiplier block 304. In the multiplier block 304, every second block of the signal having the length of 2×N is multiplied with −1, resulting in the effective part 204 which comprises a training sequence T according to the second advantageous embodiment of the invention. After this, the guard time block 305 provides the beginning of the effective part 204 with a guard time 203 whose length depends on the application used at the time. After addition of the guard time, the OFDM symbol 208 can still, if necessary, be weighted by using e.g. a raised cosine pulse. This is illustrated with a weighting block 306 in FIG. 3. The output OFDM_OUT of the OFDM modulator 301 gives an OFDM symbol which can be used as a training sequence T in the OFDM signal to be transmitted to a communication channel. After this training sequence, the OFDM signal is equipped with the data to be transmitted, OFDM modulated, which is known as such.

The training sequence correlation properties can be improved by increasing the length of the training part tr to be used for forming the training sequence. However, this reduces the number of training parts that can be transmitted in one OFDM symbol, wherein the length of the training sequence T must be possibly increased. In the example of FIG. 1, one training part tr covers one OFDM symbol. The training part can also have the length of several OFDM symbols. Another alternative to improve the correlation properties is to increase the length of the effective part 204 and to keep the number of training parts tr constant. Thus, the length of the Fourier transformation must be increased as well.

The training part correlation properties can be evaluated by determining an autocorrelation and a cross-correlation. Ideal correlation properties are in such a training part where the autocorrelation is one and the cross-correlation with any other sequence is zero. In practical applications, it is impossible to produce such a training part, but it is usually possible to design for each application to be implemented a training part which has sufficiently good correlation properties in view of the criteria presented above.

The synchronization method according to the present invention can be applied advantageously in a maximum likelihood ML synchronizer, one application example being shown as a block chart in the appended FIG. 4. The estimated maximum probability can be determined from the received OFDM signal, because it is known that the training parts recur after every Nth sample. When the correlation between the signal and the delayed signal is determined, the result is a correlation function with a detectable positive peak if the signal and the delayed signal are substantially identical. If the signal and the delayed signal are substantial negations to each other, a negative maximum is obtained for the correlation function.

The synchronizer ML operates in the following way. A received OFDM signal is conducted to an input line ML_IN in the synchronizer ML, from which the OFDM signal is transferred further to a delay block 401, a multiplier 402 and a threshold value setting block 403. In the delay block 401, the OFDM signal is delayed for N samples, where N is the length of one training part. From the delayed OFDM signal, a complex conjugate is determined in block 404, and this is transferred to the multiplier 402. In the multiplier 402, the OFDM signal and the complex conjugate of the delayed OFDM signal are multiplied with each other, and N subsequent multiplication results are summed up in a summing block 405. The result is a correlation function, from which, at the next stage, maximum and minimum points are found and the phase angle is determined. For determining the maximum and minimum points, the absolute value of the summing results is first obtained in block 406, and in a comparison block 407, the absolute value is compared with a set threshold value Th (FIG. 5*a*). In the threshold value setting block 403, the strength of the received signal is estimated. The threshold value Th is set advantageously on the basis of the estimated strength and is thus adaptive to strength variations in the received signal. The threshold value Th can also be fixed, if variations in the strength of the signal are sufficiently small.

If the absolute value of the summing result is greater than the set treshold value, a maximum energy in a so-called energy estimating window is determined by transferring the window over the incoming signal in block 408. The reason for conducting the energy determination is that in such a communication channel where multipath propagation is possible, a more accurate evaluation is obtained when determined according to energy peaks in the correlation function than When determined according to values of the correlation function. When an energy maximum point is detected, the argument of the greatest value of the values determined in the energy determination window is selected in block 409, producing an estimate for the correct timing. When the first maximum point is found, the other maximum and minimum points can be found easily, because the length of the OFDM symbol and thus also the training parts are known.

For determining the phase error, the phase angle of the correlation function is determined in a phase angle setting block 410. The determination can be made on a continuous basis, as in the synchronizer ML of FIG. 4, wherein a switch function 413 is controlled with a control line 412 at maximum and minimum points by transferring the phase angle value to a phase error evaluation block 411 where the phase error estimates are determined and an average is taken from the determined phase error estimates and advantageously converted into radians. In practical applications, the control line 412 and the switch function 413 can be implemented e.g. on the hardware level or in application software, as is known to anyone skilled in the art.

On the basis of the phase error, the frequency error is determined advantageously by dividing the determined phase error estimate by the number of samples to be examined. This phase error value is used for correcting receiver frequency errors. By using two training parts, it is already possible to find out the correct timing moment and the frequency errors. However, a better final result can be obtained by using several training parts. Consequently, by using the method described in the invention, where the phase error estimates are evaluated at each correlation peak and the estimates are averaged, a better final result is obtained.

If only one peak is used in determining the timing estimate, the most accurate result is obtained by using a median or any of the median peaks (maximum/minimum), because at these points the correlation properties are better than at the first or the last peak. Furthermore, the timing estimate can be determined also by finding all the correlation peaks first, as presented above in the description of the invention, and then averaging the estimates obtained.

It is obvious that the switch function 413 can be located also before the phase angle setting block 410, wherein the phase angle is determined at peaks only.

FIG. 6 is a reduced block chart illustrating a communication system in which the present invention can be advantageously applied. The communication system comprises a transmitter TX, a communication channel CH and a receiver RX. Blocks 601–07 constitute the baseband element of the transmitter. The bits to be transmitted are encoded with a channel and error correction encoder 601. After this, the encoded bits are represented as subcarrier symbols in block 602 which are subjected to inverse Fourier transformation in IFFT block 603. At the next stage, in a guard time provision block 604, each OFDM symbol is provided with a guard time and modified, if necessary, by windowing the spectrum properties of the transmission. The training sequence T is formed in a generating block 605 e.g. by forming an inverse Fourier transform to the training parts and adding guard times, if necessary, as presented above in this description. The formed training sequence T is added to the beginning of the data frame in a multiplexer block 606. Furthermore, in a D/A converter 607, the signal is converted into an analog signal which is conveyed to a transmitter high-frequency block 608, where the signal is subjected, in a manner known as such, to modulation onto a carrier frequency, filtering and amplification. After this, the signal is transmitted to a communication channel 609 which is for example a wireless communication channel, such as the radio channel.

In the implementation of the baseband element of the transmitter TX, it is also possible to use blocks which are partly shared for forming the training sequences T and the information symbols. For example, the IFFT block 603 and the guard time providing block 604 can be shared.

In the receiver RX, the received high-frequency signal is transferred to a receiver high-frequency block 610 where the signal is e.g. filtered, amplified and demodulated onto the baseband frequency. The signal demodulated onto the baseband frequency is converted into digital form in an A/D converter 611. The signal converted into digital form is transferred into a synchronization block 612, one example being shown in FIG. 4 and its operation being described above in this specification. In the synchronization block 612, the correct moment for the Fourier transformation is determined as well as possible phase and frequency errors are evaluated and corrected. The Fourier transformation is made in a FFT block 613 to transform the signal from a time level onto a frequency level. After this, errors caused by the communication channel are corrected in an equalizer 614 and the information is converted back into bits in a decoder 615.

In the receiver RX of the communication system of FIG. 6, there is also an AGC block 616 for the purpose of tuning the AGC amplifier of the receiver.

In the communication system of FIG. 6, only the most essential functional blocks are presented in view of describing the invention, but e.g. the blocks for controlling the operation of the transmitter TX and the receiver RX, which are known as such, are not illustrated.

The transmitter TX and the receiver RX are e.g. the transmitter and receiver of a wireless communication device. Another application for the invention is a wireless local area network (WLAN) in which terminals are connected to the wireless local area network in a wireless manner with transmitters TX and receivers RX according to an advantageous embodiment of the invention.

Furthermore, FIGS. 5a and 5b illustrate simulation results of a synchronization method according to the invention in absolute values of correlation results. The simulation of FIG. 5a uses a training sequence of prior art as well as a training sequence T according to the first advantageous embodiment of the invention, consisting of four training parts 103, 104, 105, 106. The length of the training parts 103, 104, 105, 106 is N=89. In this simulation, the training sequence of prior art consists of four such training parts. A training part advantageous for synchronization can be any sequence with good correlation properties. In a corresponding manner, the training sequence T according to the invention is formed in a way that the first 103 and second training part 104 are identical with the training part and the third 105 and fourth training part 106 are negations to the training part. In FIG. 5a, a broken curve A represents a correlation function given by a training sequence T of prior art, and a curve B represents a correlation function given by a training sequence according to the invention, respectively. It is clearly seen in the figure that on the basis of the correlation function of prior art, it is difficult to detect the correct moment of timing, because the result is a step function. In the case of prior art, it could be possible to use a threshold value to determine the correct moment of timing by setting the threshold value precisely at the starting point of the even part of the step function. In practice, however, this is very difficult, because e.g. the signal strengths change as a function of time, and therefore, a clear threshold value cannot be found. Instead, the correlation function of the training sequence T according to the invention includes peaks which are clearly easier to find. A threshold value Th is only used to determine roughly the range of the peak. Consequently, the threshold value Th does not need to be set accurately. Finding the peak (=timing estimate) accurately is started first after exceeding the threshold value Th. Finding the peak was presented above in this specification.

Furthermore, FIG. 5b shows part of the correlation function of a training sequence T according to a second advantageous embodiment of the invention. The length of the training part N=16. The training sequence T is formed in a way that the effective part 204 comprises four such training parts, the two first ones being identical with the training part tr and the third and fourth ones being negations to the training part tr. In FIG. 5b, a curve C represents a correlation function given by a training sequence according to the second advantageous embodiment of the invention. Also in this figure, peaks are clearly visible.

It is obvious that the above presented examples only elucidate the invention, wherein also other kinds of training parts can be applied in connection with the invention and the number of training parts 103, 104, 105, 106 in the training sequence T is not necessarily one or four but it can be two, three or even more than four. Also, the invention can be applied in other communication systems than wireless local area networks.

In case the length of the effective part 204 of the training parts 103, 104, 105, 106 (the even part of the OFDM symbol without a guard time) is selected to be the same as the length of the effective part of OFDM symbols to be formed from the information, e.g. the advantage is obtained that the same IFFT block can be used both for formation of OFDM symbols from the information to be transmitted and for formation of the training parts.

Although the above specification describes the invention when applied in OFDM technique, the invention can also be applied in connection with e.g. one-carrier systems. FIG. 7 shows a data frame 701 to be used in a one-carrier system. It comprises a training sequence T which is formed advantageously so that symbols s1, s2, . . . , sn are converted into training parts 702, 703, 704, 705, at least two consecutive ones 702, 703 being substantially identical and at least one training part 704, 705 being a substantial negation to said consecutive training parts 702, 703. In the one-carrier system, e.g. the structures of the transmitter (not shown) and the receiver (not shown) are different than in OFDM systems, but they are known as such to anyone skilled in the art.

In the examples above in this specification, the training parts were selected so that the correlation result obtained was a maximum and a minimum alternating. The invention can also be applied in a way that instead of alternating, the direction of the correlation peaks in the training sequence is not always changed after each training part but combinations of the directions of these peaks are used in the transmission of information. Thus, each correlation peak can be used to transmit one binary item of information. For example, using four parts, three peaks are obtained. In this case, the number of different combinations is $2^3=8$. Because advantageously at least one peak must have a different direction, the number of different combinations is $2^3-2=6$. For achieving a more accurate determination for the moment of timing and correction of the phase/frequency error, the most advantageous combination is the alternation of a maximum and a minimum. Thus, there are two alternatives to select from, i.e. one binary information can be transmitted in the training sequence. If there are more than three training parts in one training sequence, the invention can also be applied in a way that the timing is determined by finding a correlation result that makes up a peak. The estimated phase error can still be determined at several points, because the next correct determination moment is known to be at a distance of N samples. Thus, some of the training parts can be used, according to the invention, for synchronization and some for the transmission of information, such as control data. These control data can be used e.g. to notify the modulation method used in a transmission to the receiver.

In any respects, the present invention is not limited solely to the embodiments presented above but it can be modified within the scope of the appended claims.

What is claimed is:

1. A method for forming a training sequence having three or more training parts in a communication system having a transmitter and a receiver where information is transmitted at one or more carrier frequencies, said method comprising:

forming in said transmitter at least two adjacent training parts to be substantially identical;

forming at least one training part substantially as a negation to said identical training parts; and using the training sequence as a synchronization signal in said receiver.

2. A method according to claim 1, further comprising. defining a correlation function on the basis of the training sequence, wherein the correlation function has at least one positive or negative peak.

3. A method according to claim 1, further comprising transmitting information as OFDM symbols.

4. A method according to claim 3, wherein the training sequence comprises four training parts, each forming one OFDM symbol, and that the first and second training parts in the training sequence are substantially identical and the third and fourth training parts in the training sequence are substantially negations to the first and second training parts.

5. A method according to claim 3, wherein the training sequence comprises one effective part of an OFDM symbol so that the effective part is composed of at least three training parts.

6. A transmitter for transmitting information in one or several data frames at one or several carrier frequencies, the transmitter comprising means for forming at least one training sequence and connecting the training sequence to a data frame to be transmitted, the training sequence being intended for synchronizing a receiver, said means for forming also forming the training sequence of three or more training parts so that at least two adjacent training parts are formed substantially identical and at least one training part is formed substantially as a negation to said identical training parts, and means for transmitting coupled to said means for forming.

7. A communication system comprising:

a transmitter for transmitting information in a communication channel in one or several data frames, and means for forming at least one training sequence and connecting the sequence to a data frame to be transmitted, a receiver for receiving transmitted information from the communication channel, means for synchronizing the receiver, said means for forming also forming a training sequence of three or more training parts in such a way that at least two adjacent training parts are formed substantially identical and at least one training part is formed substantially as a negation to said identical training parts.

8. A communication system according to claim 7, wherein the means for synchronizing the receiver comprise:

means for forming a correlation function on the basis of the received training sequence, means for finding at least one maximum or minimum point in the correlation function, and means for determining the timing moment and phase error on the basis of at least one found maximum or minimum point.

9. A communication system according to claim 7, further comprising means for transmitting information as OFDM symbols.

10. A communication system according to claim 7, further comprising a wireless local area network (WLAN).

11. A communication system according to claim 8, wherein the means for finding said at least one maximum or minimum point comprise means for defining energy values from samples of the correlation function, wherein said at least one maximum or minimum point is arranged to be selected from said defined energy values.

12. A method for forming a training sequence having three or more training parts in a communication system having a transmitter and a receiver where information is transmitted at one or more carrier frequencies, said method comprising:

forming in said transmitter at least two adjacent training parts to be substantially identical;

forming at least one training part to be substantially different from said identical training parts; and using the training sequence as a synchronization signal in said receiver.

13. A method according to claim 12, further comprising defining a correlation function on the basis of the training sequence, wherein the correlation function has at least one positive or negative peak.

14. A method according to claim 12, further comprising transmitting information as OFDM symbols.

15. A method according to claim 14, wherein the training sequence comprises four training parts, each forming one OFDM symbol, and that the first and second training parts in the training sequence are substantially identical and the third and fourth training parts in the training sequence are substantially negations to the first and second parts.

16. A method according to claim 14, wherein the training sequence comprises one effective part of an OFDM symbol so that the effective part is composed of at least three training parts.

17. A transmitter for transmitting information in one or several data frames at one or several carrier frequencies, the transmitter comprising means for forming at least one training sequence and connecting the sequence to a data frame to be transmitted, the training sequence being intended for synchronizing a receiver, said means for forming also forming the training sequence of three or more training parts so that at least two adjacent training parts are formed substantially identical, and at least one training part is formed substantially different from said identical training parts, and means for transmitting coupled to said means for forming.

18. A communication system comprising:
- a transmitter for transmitting information in a communication channel in one or several data frames, and
- means for forming at least one training sequence and connecting the sequence to a data frame to be transmitted,
- a receiver for receiving transmitted information from the communication channel, and
- means for synchronizing the receiver using said training sequence,
- said means for forming also forming a training sequence of three or more training parts in such a way that at least two adjacent training parts are formed substantially identical, and at least one training part is formed substantially different from said identical training parts.

19. A communication system according to claim 18, wherein the means for synchronizing the receiver comprise:
- means for forming a correlation function on the basis of the received training sequence,
- means for finding at least one maximum or minimum point in the correlation function, and
- means for determining the timing moment and phase error on the basis of at least one found maximum or minimum point.

20. A communication system according to claim 18, further comprising means for transmitting information as OFDM symbols.

21. A communication system according to claim 18, further comprising a wireless local area network (WLAN).

22. A communication system according to claim 19, wherein the means for finding said at least one maximum or minimum point comprise means for defining energy values from samples of the correlation function, wherein said at least one maximum or minimum point are arranged to be selected from said defined energy values.

23. A method for forming a training sequence having three or more training parts in a communication system having a transmitter and a receiver where information is transmitted at one or more carrier frequencies, said method comprising:
- forming in said transmitter at least two adjacent training parts substantially as negations to each other;
- forming one training part to be substantially different; and
- using the training sequence as a synchronization signal in said receiver.

24. A method according to claim 23, further comprising defining a correlation function on the basis of the training sequence, wherein the correlation function has at least one positive or negative peak.

25. A method according to claim 23, further comprising transmitting information as OFDM symbols.

26. A method according to claim 25, wherein the training sequence comprises four training parts, each forming one OFDM symbol, and that the first and second training parts in the training sequence are substantially identical and the third and fourth training parts in the training sequence are substantially negations to the first and second training parts.

27. A method according to claim 25, wherein the training sequence comprises one effective part of an OFDM symbol so that the effective part is composed of at least three training parts.

28. A transmitter for transmitting information in one or several data frames at one or several carrier frequencies, the transmitter comprising means for forming at least one training sequence and connecting the sequence to a data frame to be transmitted, the training sequence being intended for synchronizing a receiver, said means for forming also forming the training sequence of three or more training parts so that at least two adjacent training parts are formed substantially as negations to each other, and at least one training part is formed substantially different, and means for transmitting coupled to said means for forming.

29. A communication system comprising:
- a transmitter for transmitting information in a communication channel in one or several data frames, and
- means for forming at least one training sequence and connecting the sequence to a data frame to be transmitted,
- a receiver for receiving transmitted information from the communication channel, and
- means for synchronizing the receiver,
- said means for forming also forming a training sequence of three or more training parts in such a way that at least two adjacent training parts are formed substantially as negations to each other, and at least one training part is formed substantially different.

30. A communication system according to claim 29, wherein the means for synchronizing the receiver comprise:
- means for forming a correlation function on the basis of the received training sequence,
- means for finding at least one maximum or minimum point in the correlation function, and
- means for determining the timing moment and phase error on the basis of at least one found maximum or minimum point.

31. A communication system according to claim 29, further comprising means for transmitting information as OFDM symbols.

32. A communication system according to claim 29, further comprising a wireless local area network (WLAN).

33. A communication system according to claim 30, wherein the means for finding said at least one maximum or minimum point comprise means for defining energy values from samples of the correction function, wherein said at least one maximum or minimum point is arranged to be selected from said defined energy values.

* * * * *